(12) United States Patent
Siadous et al.

(10) Patent No.: US 6,977,007 B2
(45) Date of Patent: Dec. 20, 2005

(54) METHOD FOR SEPARATING A GAS MIXTURE WITH A PERMEATION MEMBRANE UNIT

(75) Inventors: Nicolas Siadous, Vincennes (FR); Yves Engler, Chatou (FR); Christian Monereau, Paris (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 10/496,232

(22) PCT Filed: Nov. 13, 2002

(86) PCT No.: PCT/FR02/03877

§ 371 (c)(1),
(2), (4) Date: May 19, 2004

(87) PCT Pub. No.: WO03/043720

PCT Pub. Date: May 30, 2003

(65) Prior Publication Data

US 2005/0005765 A1    Jan. 13, 2005

(51) Int. Cl.$^7$ .......................... B01D 53/04; B01D 53/22

(52) U.S. Cl. .............. 95/55; 95/117; 95/139; 95/143; 95/236; 95/237

(58) Field of Search .............. 95/45, 55, 116, 95/128, 132, 133, 135–137, 139, 141–143, 95/232–237, 117

(56) References Cited

U.S. PATENT DOCUMENTS

| | | | |
|---|---|---|---|
| 3,186,145 A * | 6/1965 | Pelton et al. ............... | 95/180 |
| 4,398,926 A * | 8/1983 | Doshi ......................... | 95/55 |
| 4,466,814 A * | 8/1984 | Herbort et al. ............. | 95/216 |
| 4,576,615 A * | 3/1986 | Netzer et al. ............... | 95/174 |
| 4,726,816 A * | 2/1988 | Fuderer ....................... | 95/98 |
| 4,732,577 A * | 3/1988 | Koizumi et al. ............ | 95/101 |
| 4,836,833 A * | 6/1989 | Nicholas et al. ............ | 95/55 |
| 4,846,851 A * | 7/1989 | Guro et al. ................. | 95/100 |
| 4,861,351 A * | 8/1989 | Nicholas et al. ............ | 95/93 |
| 4,963,339 A * | 10/1990 | Krishnamurthy et al. ................... | 423/437.2 |
| 5,435,836 A * | 7/1995 | Anand et al. ............... | 95/45 |
| 5,753,010 A * | 5/1998 | Sircar et al. ................ | 95/45 |
| 6,322,611 B1 | 11/2001 | Engler | |
| 6,416,568 B1 * | 7/2002 | Wallace et al. ............. | 95/55 |
| 6,514,317 B2 * | 2/2003 | Hirano et al. .............. | 95/96 |

FOREIGN PATENT DOCUMENTS

| | | | |
|---|---|---|---|
| EP | 0367618 A1 * | 5/1990 | |
| EP | 0 595 100 A1 | 10/1993 | |
| EP | 1 018 488 A1 | 12/1999 | |
| FR | 2 758 475 | 1/1997 | |

OTHER PUBLICATIONS

International Search Report for PCT/FR02/03877.

* cited by examiner

*Primary Examiner*—Robert H. Spitzer
(74) *Attorney, Agent, or Firm*—Linda K. Russell

(57) ABSTRACT

A method of separating a gas mixture using a permeation membrane unit, wherein the gas mixture, containing primarily hydrogen and carbon monoxide, is first treated to reduce the level of secondary components to lower than 100 molar ppm.

16 Claims, 3 Drawing Sheets

METHOD FOR SEPARATING A GAS MIXTURE WITH A PERMEATION MEMBRANE UNIT

The present invention relates to a method for separating a gas mixture with a permeation membrane unit, of the type in which the gas mixture is derived from a reaction unit and comprises, as its main constituents, essentially hydrogen and carbon monoxide.

The consumption of gas mixture essentially containing hydrogen and carbon monoxide, and possibly also water, carbon dioxide, methane, nitrogen and/or argon, is important in numerous industries because these mixtures constitute synthesis gases that are used to produce various products. They are in fact used as raw materials for the production, for example of hydrogen, of carbon monoxide, of carbon dioxide, or of an $H_2/CO$ mixture in a predetermined ratio for miscellaneous chemical syntheses, particularly the synthesis of methanol, acetic acid, or the synthesis of reducing atmospheres for surface treatments, for metallurgical operations, etc.

These gas mixtures are generally derived from one or a plurality of reaction media, themselves supplied with gas feed fluids. Examples of units processing these reaction media include the units for steam reforming of liquid or gaseous hydrocarbons, for self-generated thermal reforming, for carbon dioxide reforming, for methanol reforming or cracking, or for the partial oxidation of gaseous, liquid or solid compounds containing carbon and hydrogen.

The use of permeation membrane units to separate a gas mixture of the aforementioned type into one or a plurality of production fluids is increasingly common, because these units are easy to operate and require a relatively small initial investment for a satisfactory separating efficiency.

However, the tracking of the performance of these units has revealed that the separating efficiencies decreased over time, contrary to what was anticipated for gas mixtures of the aforementioned type. This change in the efficiency results, depending on each case, in a decrease in the extraction yield, in a decrease in purity or a modification of the desired $H_2/CO$ ratio, all these mechanisms having a negative effect from the economic standpoint.

When the loss of efficiency becomes excessive, it is necessary to replace the permeation membranes of these units, icurring an additional investment cost, these membranes generally representing a major share of the cost of the membrane unit, especially for large units comprising several permeation membranes.

The object of the invention is to propose a method of the aforementioned type, which can be used to maintain the permeation efficiency of the membrane unit over time.

For this purpose, the invention relates to a permeation separation method of the aforementioned type, in which, upstream of the membrane unit, the gas mixture is purified into secondary constituents contained in said mixture in contents substantially lower than 100 molar ppm and harmful by accumulation to the separating efficiency of the membrane unit.

According to other characteristics of this method, considered individually, or in all technically possible combinations:

- the contents of the secondary constituents contained in the gas mixture are substantially lower than 10 molar ppm, typically substantially lower than 1 molar ppm;
- the reaction unit comprises a unit for reforming hydrocarbons with steam, the secondary constituents being, at least partly, produced by side reactions during the reforming of the hydrocarbons;
- the reaction unit comprises a self-generating thermal reforming unit, the secondary constituents being, at least partly, produced by side reactions during the self-generating thermal reforming;
- the reaction unit comprises a carbon dioxide reforming unit, the secondary constituents being, at least partly, produced by side reactions during the reforming of the carbon dioxide;
- the reaction unit comprises a methanol reforming or cracking unit, the secondary constituents being, at least partly, produced by side reactions during the reforming or cracking of the methanol;
- the reaction unit comprises a unit for the partial oxidation of compounds containing carbon and hydrogen, the secondary constituents being, at least partly, produced by side reactions during the oxidation of said compounds;
- the secondary constituents comprise at least one of the following components: an acid of the carboxylic or inorganic type, an acid anhydride, chlorinated, cyclic and/or sulfur compounds, an alcohol and/or a ketone and/or a phenolic compound, ammonia and/or at least one amino radical, at least one metal carbonyl;
- the gas mixture is purified into said secondary constituents by adsorption of said constituents by passage into an adsorbent material or by water scrubbing of the mixture, to retain and remove said secondary constituents from said mixture in aqueous solution.

The invention will be better understood from a reading of the description below, given only as an example and with reference to the drawings, in which:

FIG. 1 shows an installation 1 for producing a synthesis gas mixture and an installation 2 for separation by permeation of this synthesis gas mixture into a fraction enriched with carbon monoxide and into a stream with a high hydrogen content.

Figure 1:
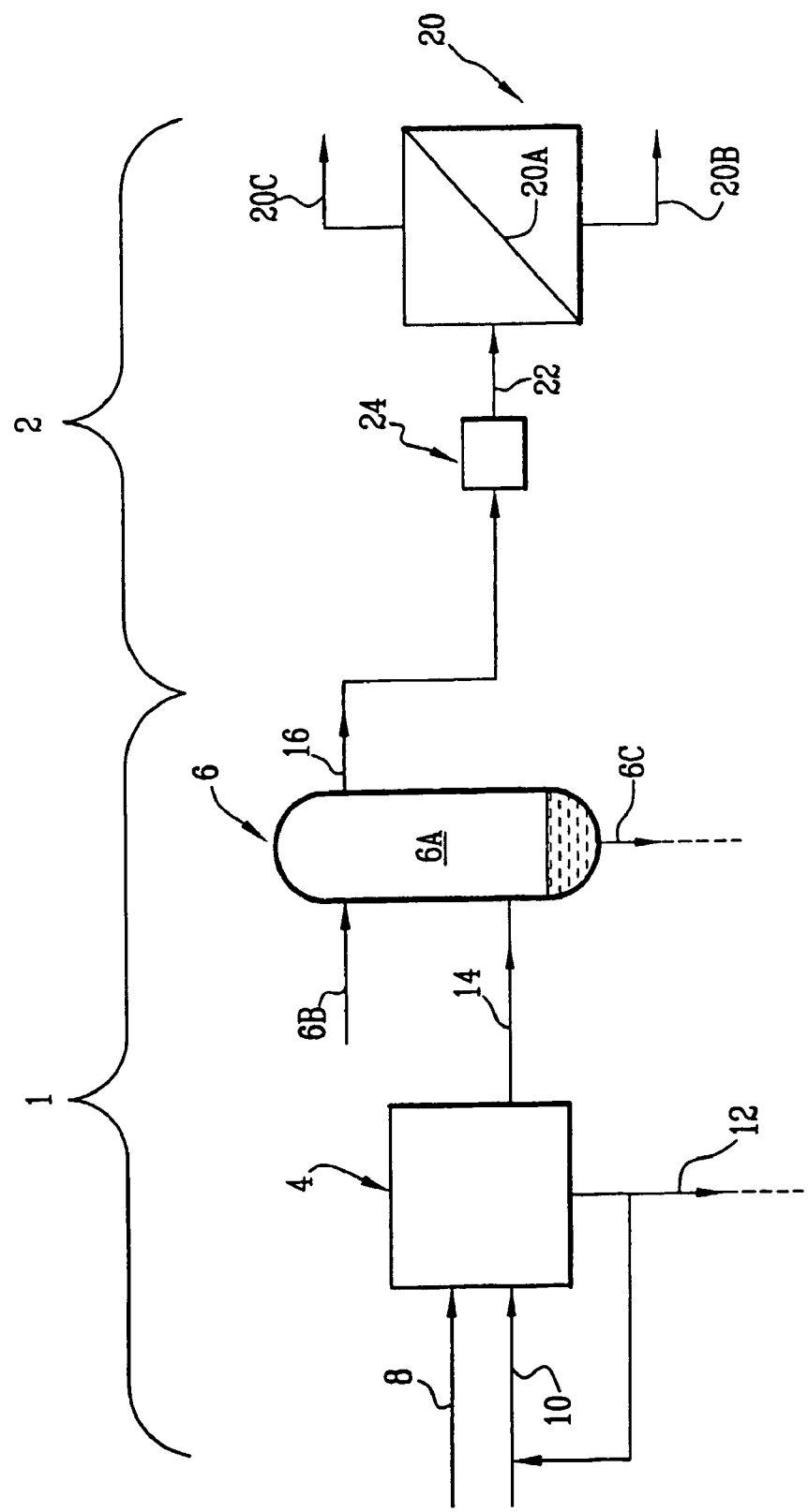
FIG. 1 is a schematic view of an installation according to the invention for separating a gas mixture derived from a reforming installation.

The installation 1, known in itself, essentially comprises a steam reforming unit 4 and a processing unit 6 designed to remove the acidic gases, in particular carbon dioxide $CO_2$.

The unit 4 is suitable for producing, from a hydrocarbon feed stream, via a feed line 8, and from a steam feed stream, via a feed line 10, both a preliminary mixture rich in hydrogen and in carbon monoxide, via a discharge line 14, and an excess of steam, via a discharge line 12, advantageously connected to the feed line 10.

The composition of this preliminary gas mixture varies according to the type of feed in 8, according to the quantity of steam injected at 10 and according to the operating pressure and temperature conditions of the unit 4.

For the type of production installation 1 considered, the preliminary mixture generally comprises as main constituents, by molar volume, 60% to 70% of hydrogen, 15% to 30% of carbon monoxide, 5% to 10% of carbon dioxide and 1% to 5% of methane.

The processing unit 6 is suitable for purifying the preliminary mixture of its acidic impurities, particularly carbon dioxide, by lowering their respective contents to values meeting predetermined specifications, particularly meeting specifications required by installations which are to be connected downstream to the production installation 1.

For this purpose, the installation 1 is provided with a production line 16 connected to the separation installation 2.

For example, the processing unit 6 comprises a column 6A for scrubbing with solvents, the solvents being for example dimethyl ether, polyethylene glycol, an amino solution and/or methanol. Introduced at the top of the column via a line 6B, these solvents are able to physically absorb most of the acidic impurities in the preliminary mixture and, once filled with these impurities, are withdrawn at the column bottom, via a line 6C, to be for example regenerated and then recycled.

The installation 2 for separating the gas mixture essentially comprises a separation membrane unit 20 and, upstream of this unit, connected by a line 22, a purification unit 24.

The membrane unit 20 comprises at least one membrane 20A, designed to separate the gas mixture by permeation into one or more production gas streams, for example, into a stream with a predetermined $H_2/CO$ ratio or into a stream with a high carbon monoxide content and into a stream with a high hydrogen content.

For example, the unit 20 in FIG. 1 is provided with a membrane 20A with a high hydrogen selectivity, suitable for producing a permeate with a high hydrogen content, via a line 20B, and a non-permeate with a high carbon monoxide content, via a line 20C.

In general, such a membrane unit 20 can comprise, in addition to the membrane or membranes 20A, themselves disposed in a permeator, ancillary equipment such as condensate separators, filters, heat exchangers designed to heat the feed mixture, to cool the streams derived from the permeator, etc.

The unit 24, of which several embodiments are described below, is suitable for purifying the gas mixture into secondary constituents which this mixture contains in the form of traces, typically in contents lower than 100 molar ppm and harmful by accumulation to the separating efficiency of the membrane unit 20.

In fact, in the absence of the unit 24, the inventors have performed accurate analyses on a large number of production facilities of gas mixtures of the same type as the aforementioned gas mixture of the production line 16, that is containing, as main constituents, essentially hydrogen and carbon monoxide, and possibly also water, carbon dioxide, methane, nitrogen and/or argon. These analyses have shown that alongside these compounds normally constituting the gas mixture, a number of complex secondary compounds could also be found in the form of traces, such as:

sulfur compounds: dimethyl-n-sulfide (n=1,2,3, . . . ), thiophene and their derivatives;
inorganic acids such as $HB_2$, HCN;
carboxylic acids: formic acid, acetic acid, etc.;
acid anhydrides such as phthalic anhydride;
metal carbonyls such as those of iron or of nickel;
alcohols: methanol, ethanol, etc.;
ketones, acetone for example;
phenolic compounds such as phenol;
cyclic compounds: n-chlorobenzene, for example;
chlorinated compounds: dichloropropane, dichloropyridine, etc., and, generally speaking, chlorinated organic compounds; and/or
ammonia and/or compounds comprising amino radicals.

These compounds are present in very small quantities in the gas mixture, in contents lower than 100 molar ppm (parts per million), generally lower than 10 molar ppm, or even very often lower than 1 molar ppm. At variable contents, these secondary constituents are found in most gas mixtures of the aforementioned type. However, their identification often requires the installation of a trap, for example an adsorbent column, in order to increase their original concentrations locally, and then to analyze them.

The inventors have also found that these secondary constituents accumulate, at least partly, on the surface or in the body of the membrane or membranes of the unit 20, while substantially modifying the separating efficiencies, by physicochemical interaction between the membrane materials and these constituents or by inhibiting their diffusion. For example, a content of these constituents substantially equal to 100 parts per billion, that is a content of about $10^{-7}$ mol, of a gas mixture at a rate of flow substantially equal to 10 000 $Sm^3/h$ generates, after six months of operation of the membrane unit 20, some ten kilograms of potential deposit on the surface or in the body of the membrane 20A, by accumulation.

The presence of these constituents is explained by:
side reactions in the reaction medium from which the gas mixture is derived, particularly in zones which are hotter or cooler than average;
side decomposition reactions during scrubbings involving complex chemical solvents, such as those used in the processing unit 6; and/or
side reactions in secondary equipment such as piping, exchangers, etc., occurring due to their nature or due to the prevailing pressure and temperature conditions.

The presence of these constituents is also favored by impurities present either in the initial feed streams, for example the feed streams of line 8 of the reforming unit 4, or in corroded portions of the circuit, or by passage through media liable to cause side reactions, such as beds of absorbent material regenerated at high temperature, not shown in FIG. 1.

Regardless of their origin, it is advantageous to stop, by means of the unit 24 according to the invention, at least a portion of these different secondary constituents upstream of the permeation membrane unit 20, in order to protect the membrane or membranes from them.

Figure 2:
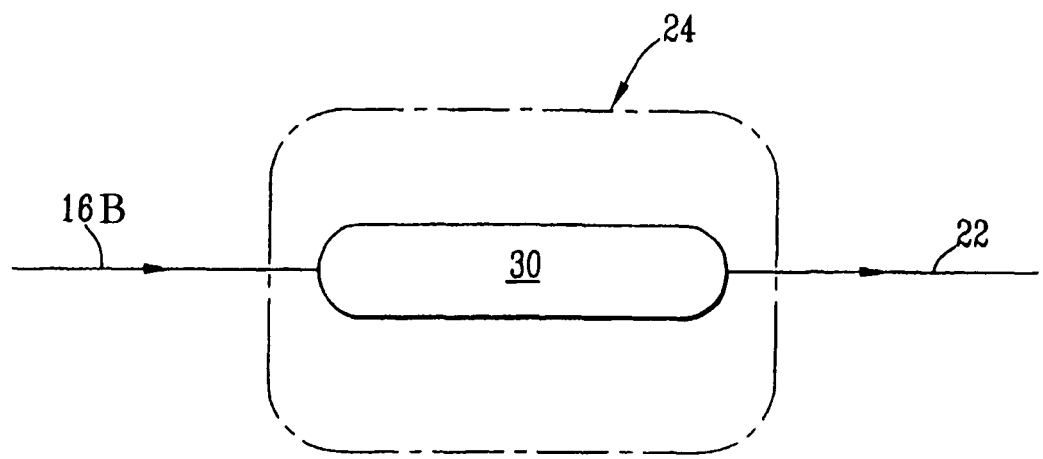
FIG. 2 is a schematic view showing a first embodiment of a unit of the installation according to the invention in FIG. 1.

FIG. 2 shows a first embodiment of the purification unit 24 according to the invention. The functional contours of the unit 24 are indicated by a broken line. The unit 24 comprises a single bottle 30 (or, as a variant, a plurality of bottles in parallel) connected at the inlet to the gas mixture feed by-pass 16B, and at the outlet to line 22.

This bottle contains an adsorbent material, such as alumina, molecular sieve, silica gel, activated charcoal, or a mixture of two or more of these materials. Advantageously, the adsorbent material contained in the bottle is doped, that is impregnated with an agent that increases its adsorptivity.

The material used can also stop certain secondary impurities by chemisorption. In this case, the material may be of a metallic type, for example a metallic oxide. The adsorption of an impurity can also be followed by its decomposition into a light constituent that is harmless to the membrane, for example CO, and a heavier constituent, for example a metal, which deposits on the adsorbent material.

The genetic term "adsorbent" will be used below to designate this material, whether the mechanism involved is physisorption, chemisorption or a combination thereof.

The bottle 30 is thus able to retain by adsorption the constituents that are harmful by accumulation to the separating efficiency of the membrane unit 20. In operation, the gas mixture derived from the reforming installation 1 passes through the adsorbent material of the bottle 30, where said material fixes, at least partly, the aforementioned constituents.

Once the adsorbent material is saturated with impurities, the bottle 30 is replaced by a fresh bottle, the saturated material being possibly regenerated by known suitable means.

Figure 3:
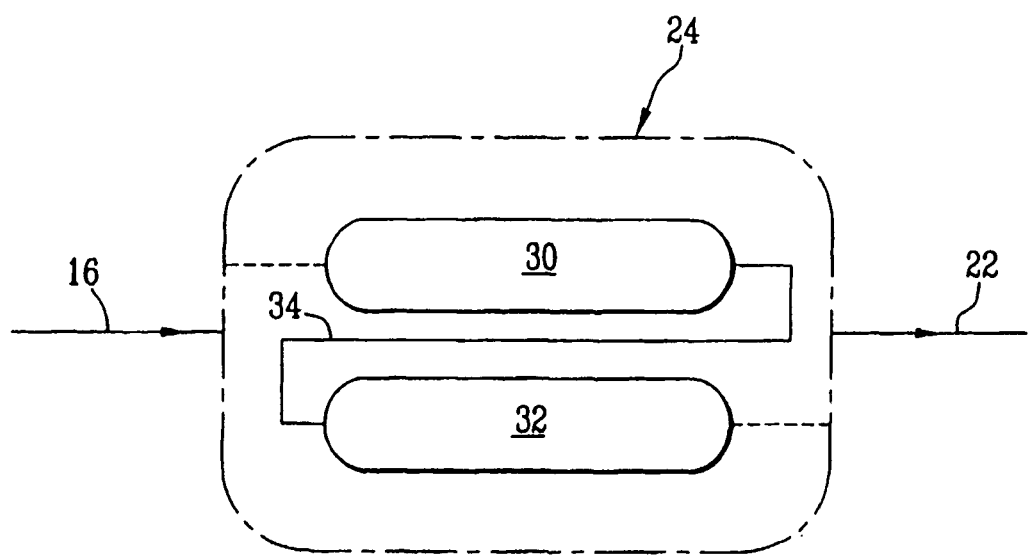
FIG. 3 is a variant of the unit in FIG. 2.

As a variant, the unit 6 comprises, in addition to the first bottle 30, a second bottle 32 connected in series to the first by a connecting line 34, as shown in FIG. 3. The unit 6 also comprises connecting valves suitable for subjecting one or the other, or both bottles in series, to the gas mixture. In this way, when both bottles adsorb the aforementioned constituents one after the other, the upstream bottle, for example the bottle 30, is saturated more rapidly than the downstream bottle, for example the bottle 32. Once the upstream bottle is completely saturated, the aforementioned valves are operated so that only the downstream bottle 32 is subjected to the gas mixture flowing in the production line 16. The time required to replace the bottle 30 by a bottle with fresh or regenerated adsorbent material. This bottle 30 is then subjected, downstream of the bottle 32, to the gas mixture, and so on.

This variant accordingly makes it possible to maintain the production of the membrane unit 20, without interrupting production to replace an adsorbent bottle.

Figure 4:
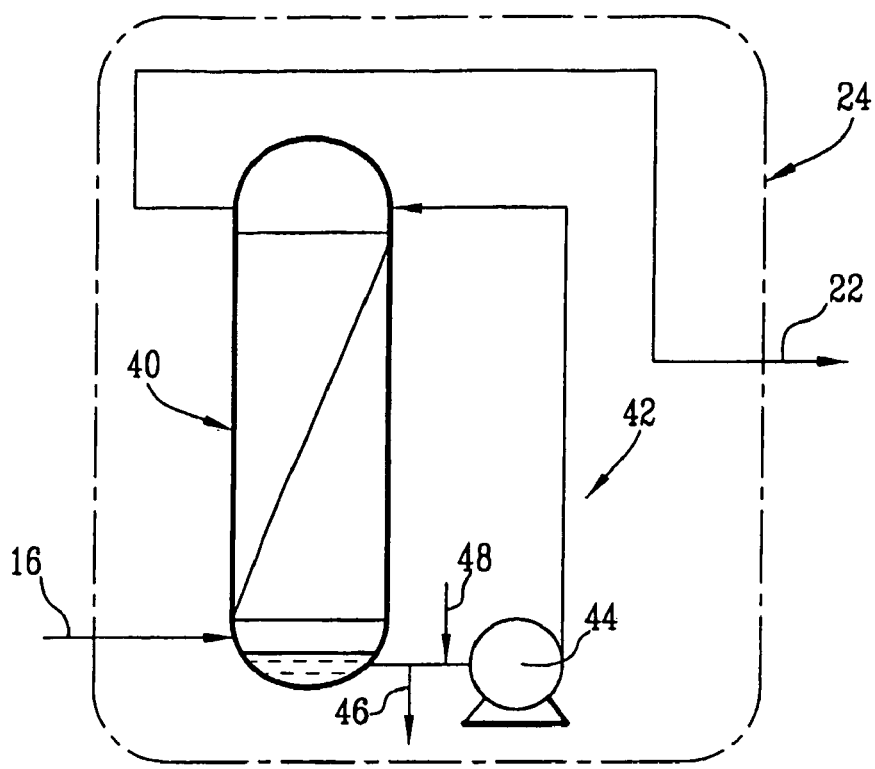
FIG. 4 is a view showing a second embodiment of the unit in FIG. 2.

FIG. 4 shows a second embodiment of the purification unit 24 according to the invention. The unit 24 comprises in this second embodiment a column 40 for water scrubbing of the gas mixture of the production line 16.

The scrubbing water used is free of solvent and the column 40 is, for example, a plate column or packed column. The unit 24 comprises a scrubbing water flow circuit 42, comprising a drive pump 44, a purge by-pass 46 and an auxiliary fresh water branch connection 48.

In operation, the gas mixture is introduced at the bottom of the column 40, while the scrub water is introduced at the top of said column. The aforementioned constituents, which are harmful by accumulation to the separating efficiency of the membrane unit 20, are accordingly dissolved by the water downflow in the column, the gas mixture being progressively purified as it rises in the column and finally withdrawn at the top via the line 22.

The pump 44 causes the scrubbing water to flow from the bottom to the top of the column, a portion of the water flowing through circuit 42 being purged at 46 and replaced by auxiliary fresh water at 48.

Depending on the secondary constituents to be retained, carefully selected chemicals can possibly be added to the scrubbing water to improve the trapping of these constituents. Only the chemicals tolerated by the separation membranes of the unit 20 are acceptable.

Figure 5:
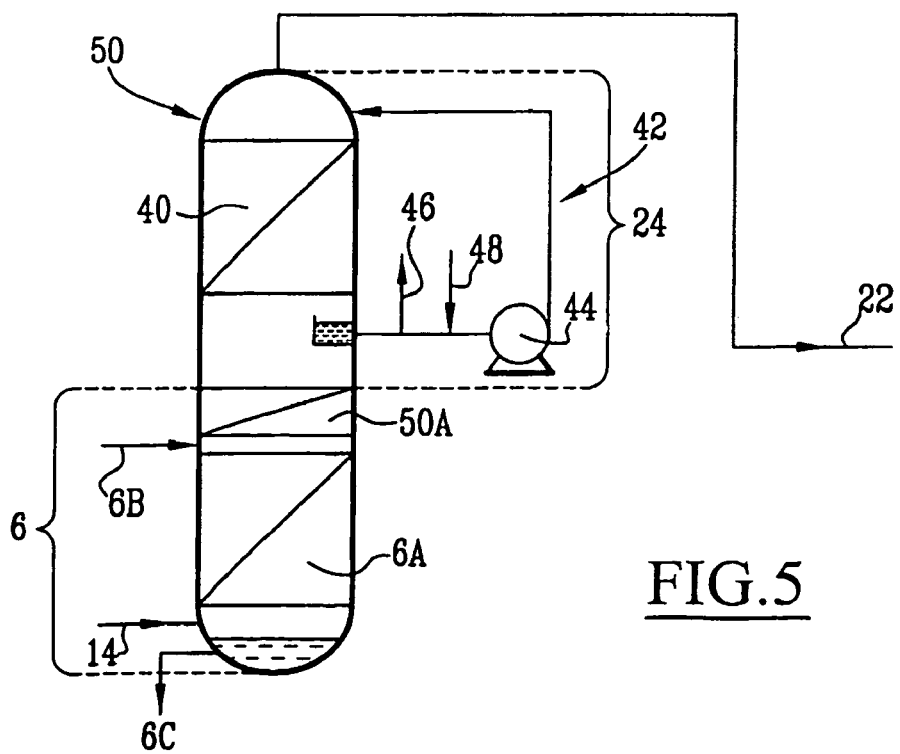
FIG. 5 is a view of a variant of the unit in FIG. 4.

FIG. 5 shows a variant of the second embodiment according to the invention, which offers the advantage of incorporating in a single scrubbing column the respective columns 6A and 40 of the units 6 and 24.

In fact, as explained above with respect to FIG. 1, the processing unit 6 of the installation 1 generally comprises a column for scrubbing by solvents, for example, amines. Furthermore, it is known in the prior art how to prepare, at the top of an amine scrubbing column designed to purify the gas mixture of its acidic impurities, particularly carbon dioxide, a closed isobaric water scrubbing loop designed to recover amines, which can vaporize or disperse in the form of fine droplets in the outgoing gas stream.

Thus FIG. 5 shows a column 50 with three levels of plates. This column 50 consists in its upper portion of the water scrubbing column 40 in FIG. 4, in its lower portion of the amine scrubbing column 6A, and in its intermediate portion of at least one plate 50A for recovering amines by dissolution of these amines in water derived from the circuit 42 of the unit 24.

Various modifications to the purification unit 24 are feasible without extending beyond the scope of the invention defined by the claims herebelow. Thus for example, the two embodiments described with respect to FIGS. 2 and 3, and 4 and 5, respectively, may be combined together in series for increased protection of the membrane unit 20A.

What is claimed is:

1. A method of separating a gas mixture containing essentially hydrogen and carbon monoxide, comprising:
   a) a first step of purifying said gas mixture to reduce the level of secondary constituents contained in said gas mixture down to a level lower than about 100 molar ppm, wherein said secondary constituent comprises at least one member selected from the group consisting of:
      1) an acid of the carboxylic or inorganic type;
      2) an acid anhydride;
      3) a chlorinated compound;
      4) a cyclic compound;
      5) a sulfur compound;
      6) an alcohol;
      7) a ketone;
      8) a phenolic compound;
      9) ammonia;
      10) an amino radical; and
      11) metal carbonyl; and
   b) a second step of separating the purified gas mixture using a permeation membrane unit.

2. The method of claim 1, wherein the level of said secondary constituents contained in said gas mixture is reduced to a level lower than about 10 molar ppm.

3. The method of claim 2, wherein the level of said secondary constituents contained in the gas mixture is reduced to a level lower than about 1 molar ppm.

4. The method of claim 1, further comprising said gas mixture being produced in a unit for reforming hydrocarbons with steam, wherein at least a portion of said secondary constituents is produced by side reactions during the reforming of the hydrocarbons.

5. The method of claim 1, further comprising said gas mixture being produced in a self-generating thermal reforming unit, wherein at least a portion of said secondary constituents is produced by side reactions during the self-generating thermal reforming.

6. The method of claim 1, further comprising said gas mixture being produced in a carbon dioxide reforming unit, wherein at least a portion of said secondary constituents is produced by side reactions during the reforming of the carbon dioxide.

7. The method of claim 1, further comprising said gas mixture being produced in a methanol reforming or cracking unit, wherein at least a portion of said secondary constituents is produced by side reactions during the reforming or cracking of the methanol.

8. The method of claim 1, further comprising said gas mixture being produced in a unit for the partial oxidation of compounds containing carbon and hydrogen, wherein at least a portion of said secondary constituents is produced by side reactions during the oxidation of said compounds.

9. The method of claim 1, wherein said gas mixture is purified to remove said secondary constituents by adsorption of said constituents by passage into an adsorbent material.

10. The method of claim 9, wherein said adsorbent material is distributed in two bottles disposed in series.

11. A method of separating a gas mixture containing essentially hydrogen and carbon monoxide, comprising:
    a) a first step of purifying said gas mixture to reduce the level of secondary constituents contained in said gas mixture down to a level lower than about 100 molar ppm, wherein said purifying comprises:
        1) water scrubbing said mixture; and
        2) retaining and removing said secondary constituents from said mixture in aqueous solution; and
    b) a second step of separating the purified gas mixture using a permeation membrane unit.

12. The method of claim 11, wherein at least a portion of said aqueous solution is purged.

13. The method of claim 11, wherein said water scrubbing is carried out with water free of solvent.

14. The method of claim 11, wherein said water scrubbing is carried out downstream of a solvent scrubbing station.

15. The method of claim 14, wherein said water scrubbing and the solvent scrubbing are carried out at different levels of the same scrubbing column.

16. The method of claim 15, wherein said scrubbing water is drawn off in the intermediate portion of the single column and reinjected at least partly in a higher zone of the column.

* * * * *